(12) United States Patent
McQueen

(10) Patent No.: US 7,095,126 B2
(45) Date of Patent: Aug. 22, 2006

(54) INTERNAL ENERGY GENERATING POWER SOURCE

(76) Inventor: Jesse McQueen, 5103 Cotton Creek, San Antonio, TX (US) 78251

( * ) Notice: Subject to any disclaimer, the term of this patent is extended or adjusted under 35 U.S.C. 154(b) by 0 days.

(21) Appl. No.: 11/144,924

(22) Filed: Jun. 3, 2005

(65) Prior Publication Data

US 2006/0076781 A1 Apr. 13, 2006

Related U.S. Application Data

(60) Provisional application No. 60/576,437, filed on Jun. 3, 2004.

(51) Int. Cl.
*F02B 63/04* (2006.01)

(52) U.S. Cl. .................... 290/1 A; 290/1 R; 290/40 C; 290/54; 290/52

(58) Field of Classification Search ................ 290/1 A, 290/1 C, 40 C, 45, 52
See application file for complete search history.

(56) References Cited

U.S. PATENT DOCUMENTS

| 5,033,565 A | * | 7/1991 | Abukawa et al. | ........... 180/443 |
| 5,036,267 A | * | 7/1991 | Markunas | .................... 332/10 |
| 5,785,136 A | * | 7/1998 | Falkenmayer et al. | ..... 180/65.2 |

* cited by examiner

Primary Examiner—Darren Schuberg
Assistant Examiner—Iraj A. Mohandesi
(74) Attorney, Agent, or Firm—Darcell Walker

(57) ABSTRACT

An external power source such as a battery is used to initially supply power to start an alternator and generator. Once the system has started it is not necessary for the battery to supply power to the system. The battery can then be disconnected. The alternator and electric motor work in combination to generator electrical power. The alternator supplies this electrical power to the two inverters. One inverter outputs part of its power to the lamp load device and part back to the electric motor/generator. This power is used to power the electric motor. The second inverter supplies power to the specific load devices that are connected to the system.

9 Claims, 2 Drawing Sheets

INTERNAL ENERGY GENERATING POWER SOURCE

CROSS-REFERENCE TO RELATED APPLICATIONS

This application is related to and claims priority from provisional patent application No. 60/576,437 filed on Jun. 3, 2004, the contents of which are incorporated herein by reference.

FIELD OF THE INVENTION

This invention relates to a system that generates electrical power and in particular to a system that substantially improves the efficiency of generating electrical power.

BACKGROUND OF THE INVENTION

Electrical energy occurs naturally, but seldom in forms that can be used. For example, although the energy dissipated as lightning exceeds the world's demand for electricity by a large factor, lightning has not been put to practical use because of its unpredictability and other problems. Generally, practical electric-power-generating systems convert the mechanical energy of moving parts into electrical energy. While systems that operate without a mechanical step do exist, they are at present either excessively inefficient or expensive because of a dependence on elaborate technology. While some electric plants derive mechanical energy from moving water (hydroelectric power), the vast majority derives it from heat engines in which the working substance is steam. Roughly 89% of power in the United States is generated this way. The steam is generated with heat from combustion of fossil fuels or from nuclear fission.

In electricity, machine used to change mechanical energy into electrical energy. It operates on the principle of electromagnetic induction. When a conductor passes through a magnetic field, a voltage is induced across the ends of the conductor. The generator is simply a mechanical arrangement for moving the conductor and leading the current produced by the voltage to an external circuit, where it actuates devices that require electricity. In the simplest form of generator the conductor is an open coil of wire rotating between the poles of a permanent magnet. During a single rotation, one side of the coil passes through the magnetic field first in one direction and then in the other, so that the induced current is alternating current (AC), moving first in one direction, then in the other. Each end of the coil is attached to a separate metal slip ring that rotates with the coil. Brushes that rest on the slip rings are attached to the external circuit. Thus the current flows from the coil to the slip rings, then through the brushes to the external circuit. In order to obtain direct current (DC), i.e., current that flows in only one direction, a commutator is used in place of slip rings. The commutator is a single slip ring split into left and right halves that are insulated from each other and are attached to opposite ends of the coil. It allows current to leave the generator through the brushes in only one direction. This current pulsates, going from no flow to maximum flow and back again to no flow. A practical DC generator, with many coils and with many segments in the commutator, gives a steadier current. There are also several magnets in a practical generator. In any generator, the whole assembly carrying the coils is called the armature, or rotor, while the stationary parts constitute the stator. Except in the case of the magneto, which uses permanent magnets, AC and DC generators use electromagnets. Field current for the electromagnets is most often DC from an external source. The term dynamo is often used for the DC generator; the generator in automotive applications is usually a dynamo. An AC generator is called an alternator. To ease various construction problems, alternators have a stationary armature and rotating electromagnets. Most alternators produce a polyphase AC, a complex type of current that provides a smoother power flow than does simple AC. By far the greatest amount of electricity for industrial and civilian use comes from large AC generators driven by steam turbines.

SUMMARY OF THE INVENTION

It is an objective of the present invention to provide an energy source that generates more energy than the energy source requires in order to operate.

It is a second objective of the present invention to provide a system that uses the excess energy produced by the energy source to power other various devices.

It is a third objective of the present invention to provide an energy source for supplying power to various devices without the reliance on an external energy source for supplying power to the energy source of the present invention.

It is a fourth objective of the present invention to provide an energy source the using energy produced by the energy source to power the energy source.

It is a fifth objective of the present invention to provide an energy source that can be initially started as desired and can produce energy until terminated as desired.

The present invention provides an energy source that is capable of producing more energy than it requires to operate. The excess energy is used to power devices. A feedback loop approach is used to channel a portion of the energy produce by the generator back to the generators power input port. This feedback loop approach enables the generator to use its own generated energy to operate. The additional energy generated by the generator is used to power other devices that can be connected to the generator.

In the method of the invention an external power source such as a battery is used to initially supply power to start an alternator and generator. Once the system has started it is not necessary for the battery to supply power to the system. The battery can then be disconnected. The alternator and electric motor work in combination to generator electrical power. The alternator supplies this electrical power to the two inverters. One inverter outputs part of its power to the lamp load device and part back to the electric motor/generator. This power is used to power the electric motor. The second inverter supplies power to the specific load devices that are connected to the system.

DESCRIPTION OF THE INVENTION

Figure 1:
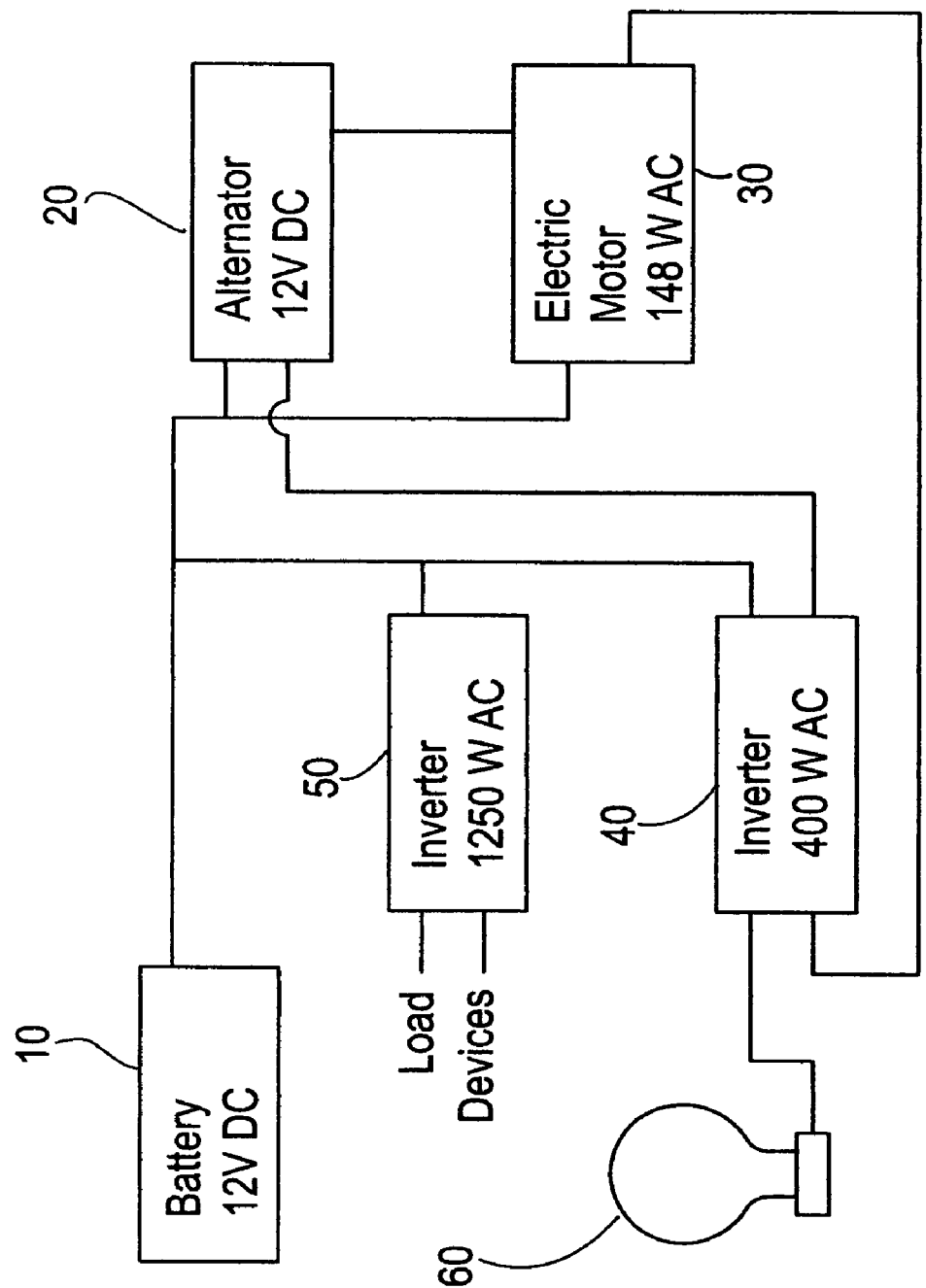
FIG. 1 is a configuration of an implementation of the internal power generating system of the present invention.

This invention is an electric power-generating device that produces several times more power than it takes to operate this system. This invention comprises a first power source that is connected to a second power source. Referring to FIG. 1, the system of the present invention comprises a battery source 10 (12 volt DC) that connects to an electrical alternator 20. The battery supplies the initial power to the system to initiate/start the operation of the alternator. The present invention can implement other power sources in addition to the illustrated battery to supply the initial power to the system. In the initial model of the present invention incorporated an alternator from a 1997 Isuzu Trooper. The invention incorporates an electric motor 30 (148 watt AC). The electric motor connects to an inverter 40 (400 watt AC). The system also comprises a second inverter 50. The battery 10 also connects to both inverters 40 and 50. Each inverter has two outputs. For the first inverter 40, one output feeds into the electric motor 30 to provide to the motor and alternator combination. The other output feeds into a lamp device 60. The lamp device is a 60-watt AC lamp. This lamp device alters the current traveling from the inverter 40 such that the current feeding into the electric motor 30 is not purely inductive. Although, FIG. 1 shows a lamp device, other loads can be used to accomplish this same altering tasks. The inverter 40 has an input from which the inverter receives power from the alternator 20. The second inverter 50 also has an input that also receives power from the alternator.

In operation, the battery 10 is used to initially supply power to start the alternator 20 and generator and 30. Once the system has started it is not necessary for the battery to supply power to the system. The battery can then be disconnected. Once started, the alternator 20 and electric motor 30 work in combination to generator electrical power. The alternator supplies this electrical power to the two inverters 40 and 50. Inverter 40 outputs part of this power to the lamp 60 and part to the electric motor 30. This power is used to power the electric motor. The second inverter 50 supplies power to the specific load devices that are connected to the system. These load devices can be any devices that operate by using electrical power.

The key aspect of the present invention is the loop between the alternator 20, electric motor 30 and the first inverter 40. A portion of the power generated by the electric motor is recycled and is used to power the electric motor. In this way the system produces the power internally that is used to power the system. This concept makes this system a self-power generating system.

Figure 2:
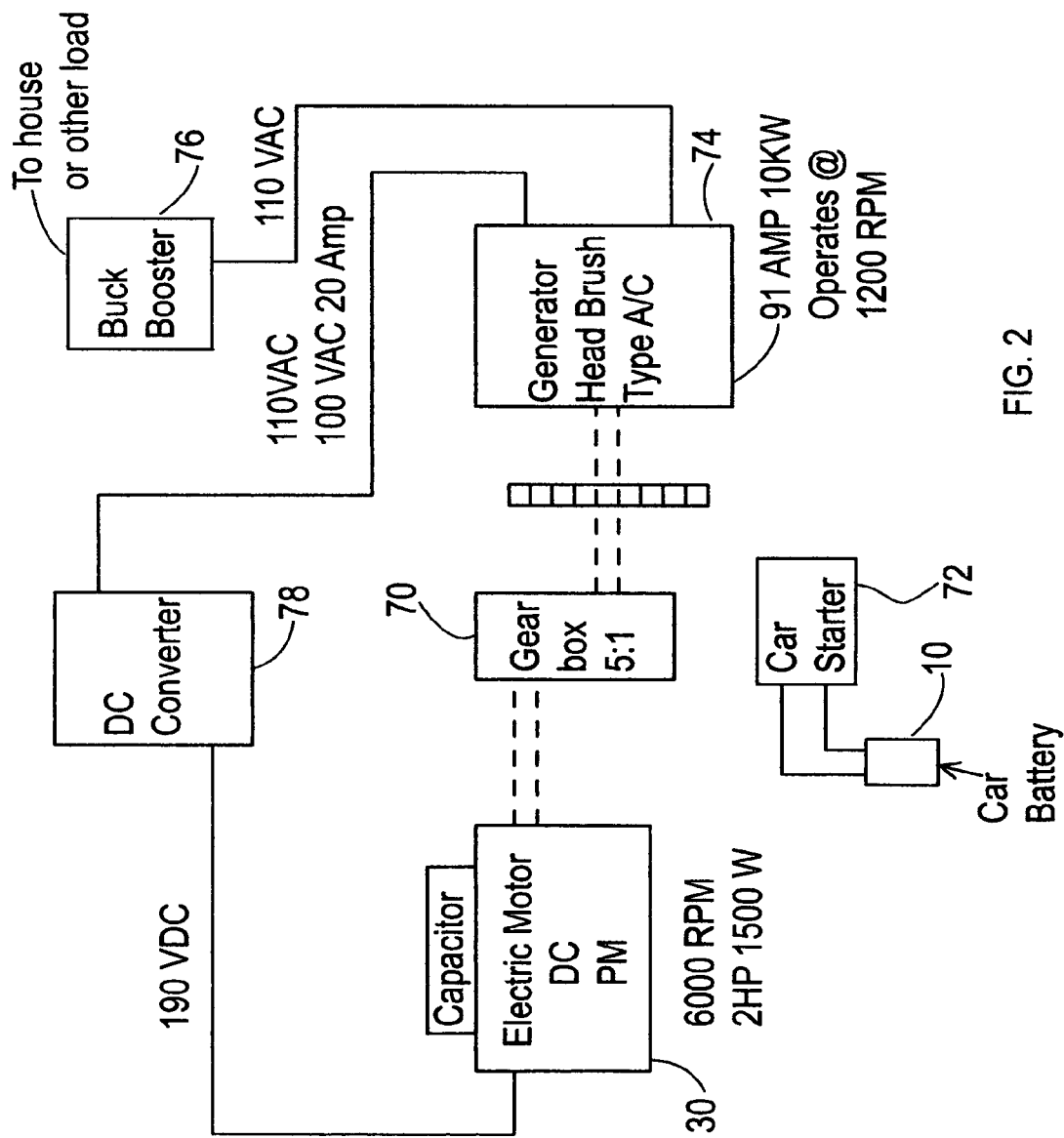
FIG. 2 is a configuration of an alternate embodiment of the internal power generating system of the present invention.

FIG. 2 shows an alternate embodiment of the power generating system of the present invention. This embodiment incorporates a gear box 70, a car starter 72, and a head brush generator 74, and buck booster 76. The car starter 72 works with the battery to initially supply power to the generator. This process is similar to the process of starting a car. The gearshift 70 increases the rpm of the generator. The Buck Booster 76 serves as the output to supply power to the various loads. This configuration also incorporates a DC converter 78.

It is important to note that while the present invention has been described in the context of a fully functioning energy generating system. This invention provides significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. A system for generating energy such that a portion of the generated energy supplies power to the system that generated the energy comprising:
   an electric motor capable of producing electric energy;
   a power source for supplying an initial amount of power to said electric motor;
   an alternator power source connected to said initial power source and said electric motor for continuously supplying power to said electric motor;
   a first inverter system connected to said electric motor, said inverter having an input through which said inverter system receives energy produced by said electric motor, said first inverter system also having one output through which said first inventor supplies power back to said electric motor to supply said electric motor with power;
   a load connected to said first inverter system via an inverter system output to alter the electric current traveling from said first inverter system such that the current feeding into the electric motor 30 is not purely inductive.

2. The system as described in claim 1 wherein said initial power source is a battery.

3. The system as described in claim 1 further comprising a second inverter having a first input connected from said battery, a second input connected from said alternator and an output connected to a specified load.

4. The system as described in claim 1 wherein said initial power supply initially supplies power to said alternator.

5. The system as described in claim 1 wherein said alternator, electric motor and first inverter from a loop wherein a portion of the generated power is recycled from said first inverter back to said electric motor.

6. The system as in claim 1 further comprising:
   a gearbox;
   a car starter; and buck booster.

7. The system as described in claim 6 wherein said gearbox increases generator rpm's.

8. The system as described in claim 7 wherein said buck booster connects to loads and supplies power to various loads.

9. The system as described in claim 8 further comprising a DC generator.

\* \* \* \* \*